United States Patent
Jiang et al.

(10) Patent No.: US 11,620,289 B1
(45) Date of Patent: Apr. 4, 2023

(54) DATA-DRIVEN QUERY-EXECUTION SCHEDULING

(71) Applicant: Snowflake Inc., Bozeman, MT (US)

(72) Inventors: Qiming Jiang, Redmond, WA (US);
Orestis Kostakis, Redmond, WA (US);
John Reumann, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/930,277

(22) Filed: Sep. 7, 2022

(51) Int. Cl.
*G06F 16/00* (2019.01)
*G06F 16/2453* (2019.01)
*G06F 16/27* (2019.01)

(52) U.S. Cl.
CPC ........ *G06F 16/24542* (2019.01); *G06F 16/27* (2019.01)

(58) Field of Classification Search
CPC ............... G06F 16/2455; G06F 16/334; G06F 16/24542; G06F 16/24549
See application file for complete search history.

(56) References Cited

U.S. PATENT DOCUMENTS

2020/0349161 A1* 11/2020 Siddiqui ........... G06F 16/24542
2021/0096915 A1* 4/2021 Patel ..................... G06F 9/5072

OTHER PUBLICATIONS

Gupta et al., "PQR: Predicting Query Execution Times for Autonomous Workload Management",2008, IEEE, pp. 1-10 (Year: 2008).*

* cited by examiner

*Primary Examiner* — Alexander Khong
(74) *Attorney, Agent, or Firm* — Schwegman Lundberg & Woessner, P.A.

(57) ABSTRACT

Embodiments of the present disclosure may provide a database optimization system that can generate computational values through a database compiler and assignment data for execution of a query by a plurality of nodes of a database system. The computational values and assignment data can be generated by one or more machine learning schemes. The machine learning schemes can be trained on previous computational values and previous assignment data.

25 Claims, 6 Drawing Sheets

DATA-DRIVEN QUERY-EXECUTION SCHEDULING

TECHNICAL FIELD

The present disclosure generally relates to efficiently managing database query execution in a database system.

BACKGROUND

Databases can implement computing clusters, such as cloud computing nodes, to process queries. Queries can involve a number of tasks that can be executed sequentially or concurrently, and it is difficult to determine in which order or plan to implement the different tasks from different queries.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, data warehousing and data processing systems can allow execution of multiple tasks concurrently using the same set of computing clusters. In some embodiments the tasks are referred to as queries or statements that are issued usually in a database language such as SQL. There exist practical limits as to how many concurrent tasks can be executed on a given cluster, and how many tasks should be executed so as to not reduce the performance of the cluster. It is preferential to determine the optimal number of concurrent tasks for each execution case, such that the compute clusters are utilized as much as possible without exceeding the optimal limits, which is difficult because the myriad different execution paths per case creates dynamically changing computing loads, and it can be difficult to not overrun or exceed the optimal limit. In some example embodiments, an optimal number of tasks is not fixed but rather depends on the specific type of tasks and task coordination that a given case seeks to execute on the computing cluster. In particular, and in accordance with some example embodiments, an optimal number of queries depends on characteristics of each task, and more specifically the requirements these tasks impose on the computing cluster in terms of resources.

To address the foregoing, in some example embodiments a query resource database system implements improved query scheduling on a multi-server cluster for data-related work loads, in such a way as to improve a throughput with minimal or no increase in the latency of the queries. In some example embodiments, the query resource database system is augmented with processing to determine a total amount of time a given query takes from submission to termination. In some example embodiments, the query resource database system implements the improved throughput query scheduling by implementing a resource profile prediction engine that generates prediction profiles and an assignment decider engine that manages assignment of queries based on database resource data.

Figure 1:
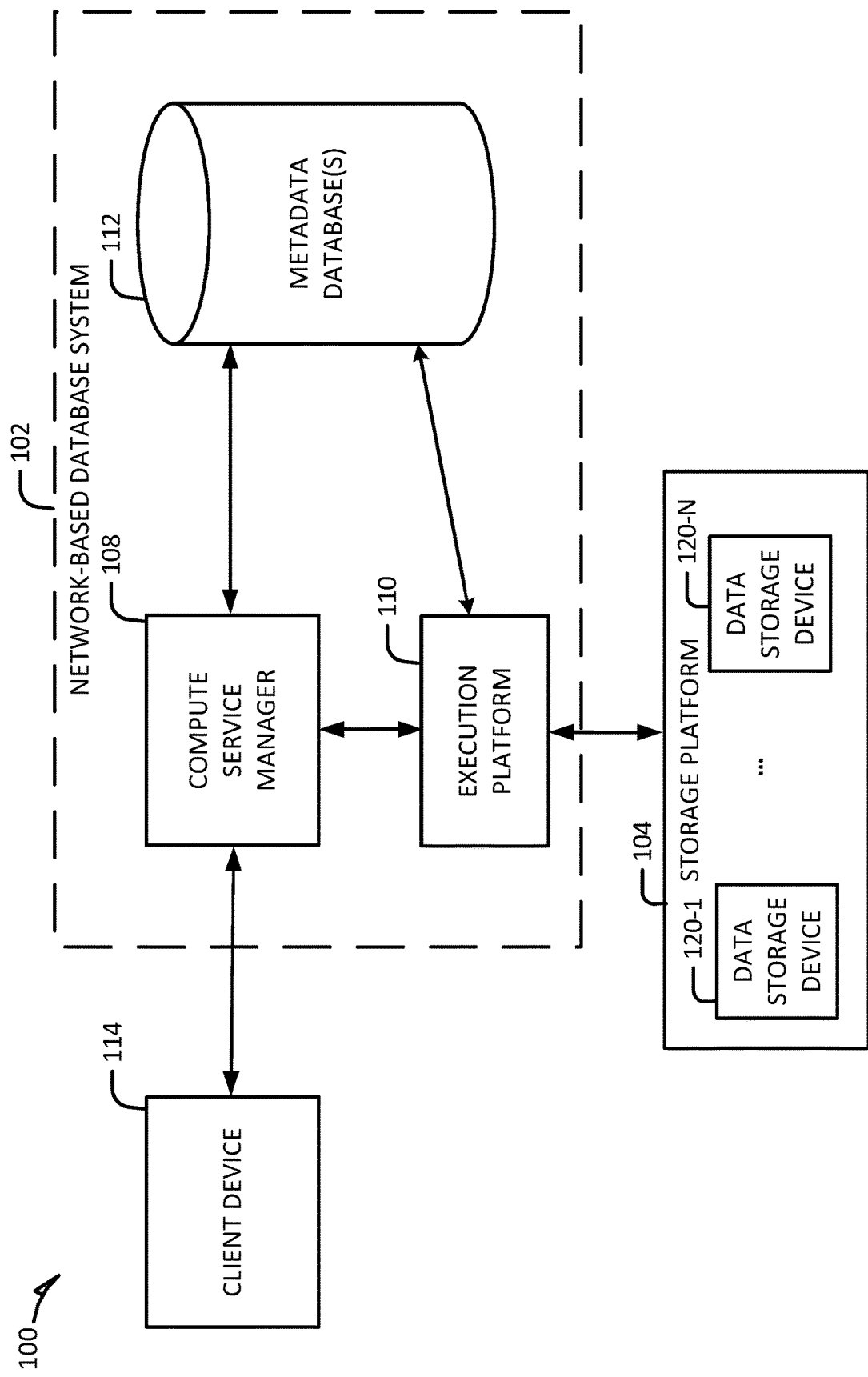
FIG. 1 illustrates an example computing environment in which a network-based database system can implement, according to some example embodiments.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses.") The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query, and scanning only the pertinent micro-partitions to respond to the query. Metadata may be automatically gathered on all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (00M) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
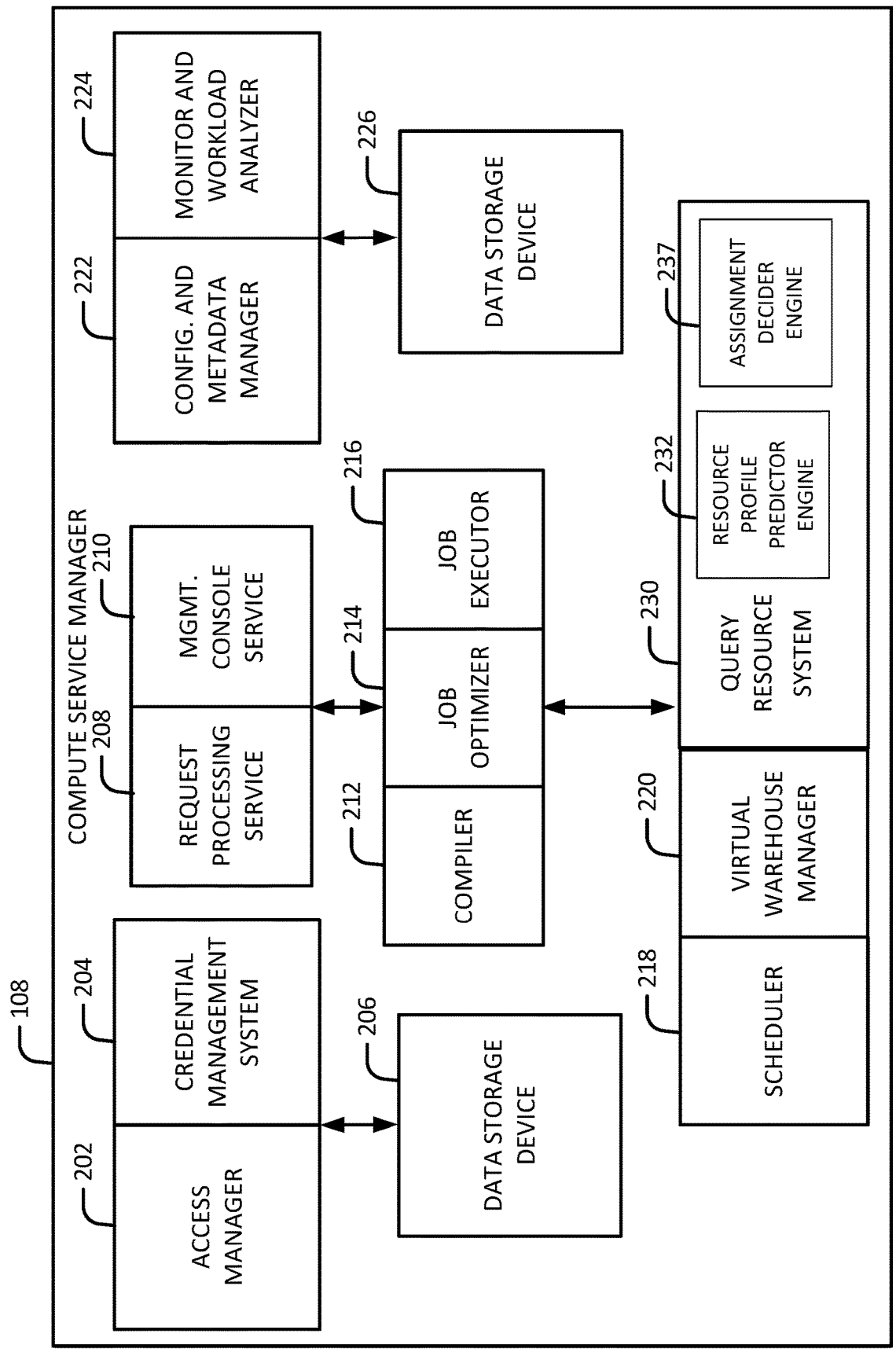
FIG. 2 is a diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., an access metadata database in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a compiler 212, a job optimizer 214, and a job executor 216. The compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A scheduler 218 sends received jobs to the appropriate services or systems for compilation, optimization, and dispatch to the execution platform 110 of FIG. 1. For example, jobs may be prioritized and then processed in that prioritized order. In an embodiment, the scheduler 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the scheduler 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The query resource database system 230 is configured to perform online error checking and offline error checking, as discussed in further detail below.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), and should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

Figure 3:
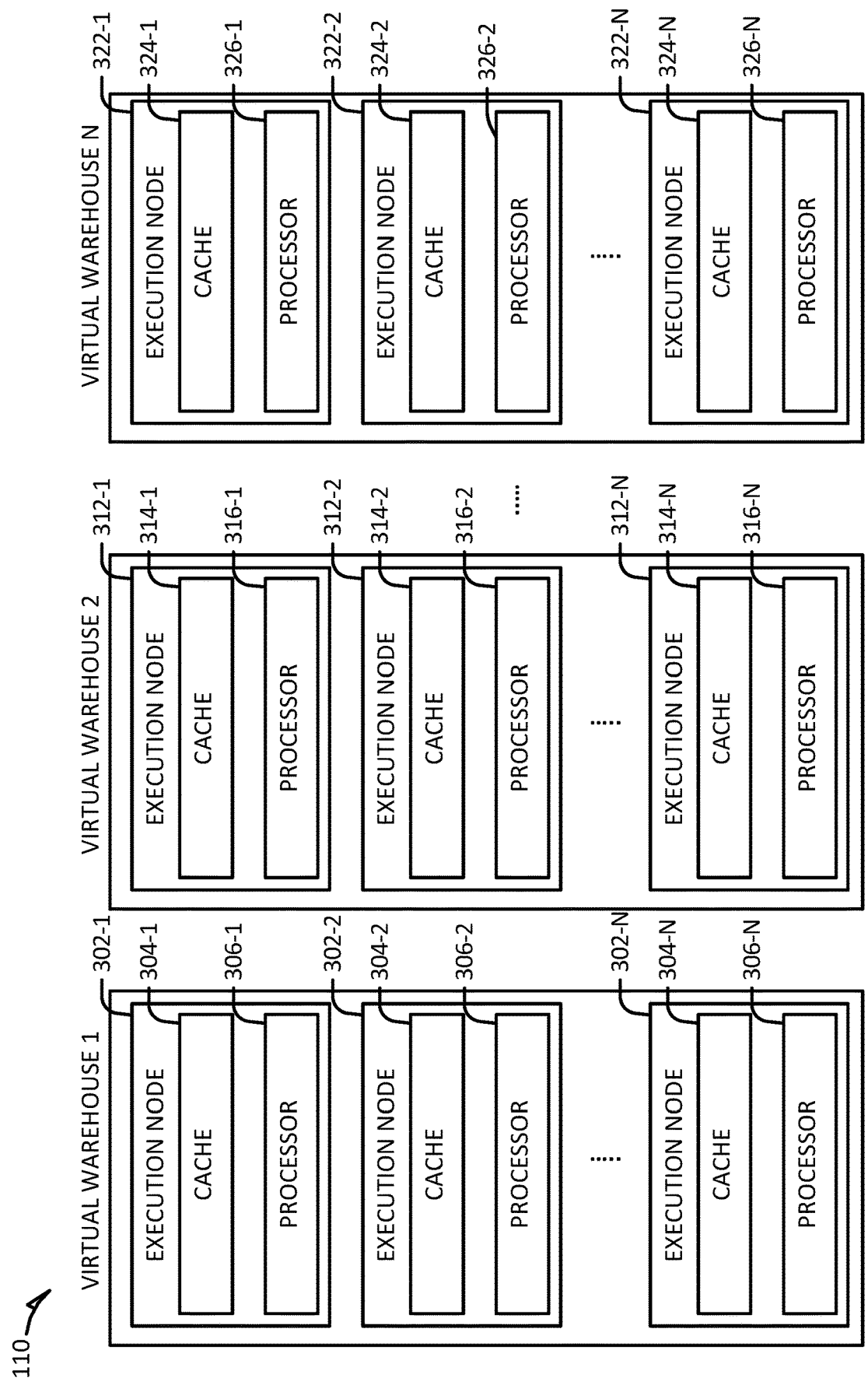
FIG. 3 is a block diagram illustrating components of an execution platform, according to some example embodiments.

FIG. 3 is a block diagram illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

As discussed above, data warehousing and data processing systems can allow execution of multiple tasks concurrently using the same set of computing clusters. In some embodiments the tasks are referred to as queries or statements that are issued usually in a database language such as SQL. There exist practical limits as to how many concurrent tasks can be executed on a given cluster, and how many tasks should be executed so as to not reduce the performance of the cluster. It is preferential to determine the optimal number of concurrent tasks for each execution case, such that the compute clusters are utilized as much is possible without exceeding the optimal limits which is difficult because the myriad of different execution paths per case creates dynamically changing computing loads and can be difficult to not over run or exceed the optimal limit. In some example embodiments an optimal number of tasks is not fixed (e.g., not a fixed number) rather depends on the specific type of tasks and task coordination that a case (e.g., query plan, application) seeks to execute on the computing cluster. In particular, and in accordance with some example embodiments, an optimal number of queries depends on characteristics of each task, and more specifically the requirements of these tasks impose on the computing cluster in terms of resources (e.g., processor, memory, storage such as space and bandwidth, and network).

To address the foregoing, in some example embodiments a query resource database system 230 implements improved query scheduling on a multi-server cluster for data related work loads, in such a way as to improve a throughput (e.g., number of queries executed and completed over a unit of time) with minimal or no increase in the latency of the queries (e.g., time it takes for queries to complete their own execution). In some example embodiments, the query resource database system 230 is augmented with processing to determine a total amount of time a given query takes from submission to termination (e.g., keep waiting-in-queue times low). In some example embodiments the query resource database system 230 implements the improved throughput query scheduling by implementing a resource profile prediction engine 232 that generates prediction profiles and an assignment decider engine 237 that manages assignment of queries based on database resource data.

In some example embodiments, resource profile prediction involves predicting an amount of resources (e.g., computational resources of different types) that will be required or otherwise used for executing a given query. In some example embodiments, query assignment involves an approach for determining if, when, and on which execution nodes a given query should be executed. In this way, the query resource database system 230 implements the two engines to accurately predict the resources will be required by a given task for each task, and further implement an optimal way of aggregating queries into and across servers or clusters for execution.

With regard to the resource profile prediction engine 232, one issue is as follows: often users generate queries in the form of SQL text, which then need to be compiled and executed. For each query to be executed, the query resource database system 230 is to ensure that there are enough of the required computational resources available to perform the query. Determining the required computational resources in advance cannot always be performed accurately due to the dynamic and complex nature of resource availability inquiry as the query processing progresses and the number and type of queries being processed.

To this end, the resource profile prediction engine 232 submits the query to the compute service manager 108, which manages coordination of the entire lifetime of the query. Apart from network routing and authentication processes, one of the first steps in a query's lifetime is the parsing and compilation of the SQL text during this query completion phase. During the query completion phase, the compiler 212 generates a query graph (e.g., a directed acyclic graph, DAG) in which the vertices (e.g., notes) correspond to different execution steps, and the edges of the graph (e.g., lines) correspond to dependencies (e.g., that is, which steps or tasks can and should be computed before other steps or tasks). In some example embodiments, the compiler 212 also accesses important metadata related to the underlying database data (e.g., user table data) over which the query will be executed. In some example embodiments, metadata comprises data to identify which files on disk (e.g., of an execution node, FIG. 3) contain data that is likely relevant to the query (e.g., data requested for processing by the query, per "SELECT" and "WHERE" clauses), the sizes of the files on said disks, information about datatypes and ranges of values or partitions for these different tables and other parameters.

In some example embodiments the resource profile prediction engine 232 is configured to predict the required amount of computational resources for executing a query. In some example embodiments a resource profile is a vector that consists of the values for different resource types that the query execution will require. In some example embodiments resource types for a given query comprise one or more of: CPU cores, memory, network bandwidth, disk reads, and disk writes.

As discussed in further detail with reference to FIG. 4 below, the resource profile prediction engine 232 receives as an input a query graph and relevant metadata, and by utilizing historical data, generates the resource profile for the query (e.g., a vector containing information such as CPU cycles required to complete given task, memory footprint or the like). In some example embodiments, based on the proposed resource profile, the compute service manager 108 generates a determination on whether the given query can be executed immediately or should be queued until its previous queries terminate and more resources are available. In some example embodiments the resource profile prediction engine 232 implements machine learning schemes (e.g., decision trees, a fully connected neural network) to perform resource profile prediction. In some example embodiments, the resource profile prediction engine 232 trains the machine learning schemes over many diverse problem instances (e.g., problems and queries) such that the solutions for predictions to various types of query problems is learned in the model (e.g., integrated in the weights of a fully connected neural network). In some example embodiments, classes of query statements can be grouped as subsets for training based on identification of a given word in a given query. That is, there can be different or multiple resource profile predictor indicators, specifically for different statement types (e.g., INSERT versus SELECT).

Further, in some example embodiments, the resource profile prediction engine 232 implements specialized sub-predictor parameters for different resource types, such as, for example, one sub-predictor type to predict memory usage, another sub-predictor type to predict CPU usage, and so on. In some example embodiments, while the resource profile prediction engine 232 is configured to train and learn to generate as accurate results as possible for the given query types, it may not be possible in each scenario (e.g., over- versus under-predicting resources to be used); as such, and in accordance with some example embodiments, the resource profile prediction engine 232 is tuned to generate one-sided errors that are under the uncertainty level (e.g., generate resource prediction that is more likely to be lower than what is actually used by ensuring the errors are one-sided under a level of uncertainty in training).

With regard to the assignment decider engine 237, one issue with query assignment is as follows: given a set of computing machines that are provisioned for executing queries (e.g., servers that constitute a virtual warehouse), a set of existing queries already being executed, and an incoming query that needs to be executed, the assignment decider engine 237 determines if, when, and where the query should be executed. In some example embodiments, in regard to "when", the query can be executed immediately or queued. In regards, to "where", a query can be assigned to one or more specific servers for execution and with more specific constraints (e.g., use X amount of CPU cores, or restricted to Y amount of process-threads); further, similar restrictions apply in some example embodiments for different resource types such as network bandwidth, network interface cards, disk read operations per minute, disk writes bandwidth per second, and so on, in accordance with some example embodiments. In regard to "if", in the extreme case, a given query might not be executable given the total resources allocated by the user, altogether or within reasonable time limits that are practical for user experience or computational expense reasons.

To address the foregoing query assignment issues, the assignment decider engine 237 is configured to manage determinations for scheduling of the queries (e.g., when, where, how, and if the query scheduled). Generally, after a query compilation phase, and in accordance with some example embodiments, all relevant information for the query is passed on to a scheduler 218 that manages coordination of the execution phase of the query. In some example embodiments the assignment decider engine 237 is integrated to interface with the scheduler 218 for the scheduling determinations discussed above. In some example embodiments, the assignment decider engine 237 receives as input for each query the query's resource profile as well as the current execution state of the compute cluster (e.g., workload, resource availability of nodes in the execution platform 110). Further, in some example embodiments, the assignment decider engine 237 further references historical execution data, such as user usage history and types of historical workloads implemented by users. In some example embodiments, the historical data comprises previous query graphs, corresponding metadata values, and the resources profiles that correspond to the previous query graphs that were implemented by users of the distributed database (e.g., for each query graph, which resource profile was used in execution of the query). In some example embodiments, the historical data comprises previous query graphs, corresponding metadata values, and the corresponding implemented resources profiles from all users of the distributed data system to robustly train the models. In some example embodiments, the historical data comprises previous query graphs, corresponding metadata values, and the corresponding implemented resources profiles from a subset of users of the distributed data system to more specifically train the model for queries that are most common to a given organization (e.g., train the model for a sales company where queries are commonly arranged as sales data, train the model for queries common to a network media streaming services ad provider), or for privacy concerns. In some example embodiments, queries are stored in a pool of queries that are queued due to the fact that at any moment any user can issue a query.

To this end, and in accordance with some example embodiments, the assignment decider engine 237 performs the assignment decisions based on the set of queued queries and for all of queries in concert for execution (e.g., pausing some queries in the pool to save memory because another of the queries in the pool is a large database job that will require a large amount of memory). In this way, with multiple queries queued, the assignment decider engine 237 can implement a number of different queuing strategies. In some example embodiments, first-in-first-out is a query strategy in which the queries are scheduled simply on order of entry or receipt. In some example embodiments, the scheduling can be implemented by the assignment decider engine 237 using a priority-based ordering scheme where each is assigned a preconfigured priority level.

In some example embodiments the scheduling is configured to implement a greedy approach in which any query (e.g., agnostic to the queries' current scheduled execution order) is scheduled to be executed as soon as resource types and quantities become available. In some example embodiments the scheduling is implemented by reducing the number of reads from disk to provide better disk cache utilization. In some example embodiments, the assignment decider engine 237 implements one or more machine learning schemes (e.g., fully connected neural network, XG boost) that are trained on a diverse set of training data (e.g., query types, problem types) to implement query assignment. In some example embodiments, the assignment decider engine 237 is configured to be trained on database account global patterns and issue a series of queries (e.g., INSERT preceding SELECT statements especially over empty and new tables). In some example embodiments the assignment decider engine 237 takes into account the behavior of a specific set of users, such as the users' temporal patterns, and assigns queries by training the model on the specific subset of users historical data, in accordance with some example embodiments. As shown in further detail below, the scheduler 218 passes all the necessary information to the assignment decider engine 237 when every decision needs to be made regarding one or more queries or pools of queries. In some example embodiments the assignment decider engine 237 then returns assignment data, and the scheduler 218 implements the assignment data to generate a query execution plan for execution.

In some example embodiments, in order to scale for large database implementations, multiple assignment decider engines can be implemented in the network-based database system 102. In some example embodiments the assignment decider engine 237 is exclusively responsible for managing a distinct set of machines. In some example embodiments training the assignment decider engine 237 is performed using historical data for both a specific set of users and global activity data. In some example embodiments, all database activity across the entire database system is implemented for training the machine learning model to better learn and integrate the SQL queries domain data. In some example embodiments the field of reinforcement learning (e.g., "RL", a sub-field of machine learning), which manages issues where an agent learned to take actions to maximize the notion of cumulative reward, is implemented by the assignment decider engine 237. In some example embodiments, an RL model in the assignment decider engine 237 is trained on previous historical instances of user data and specifically over periods of time (e.g., series of decisions).

Figure 4:
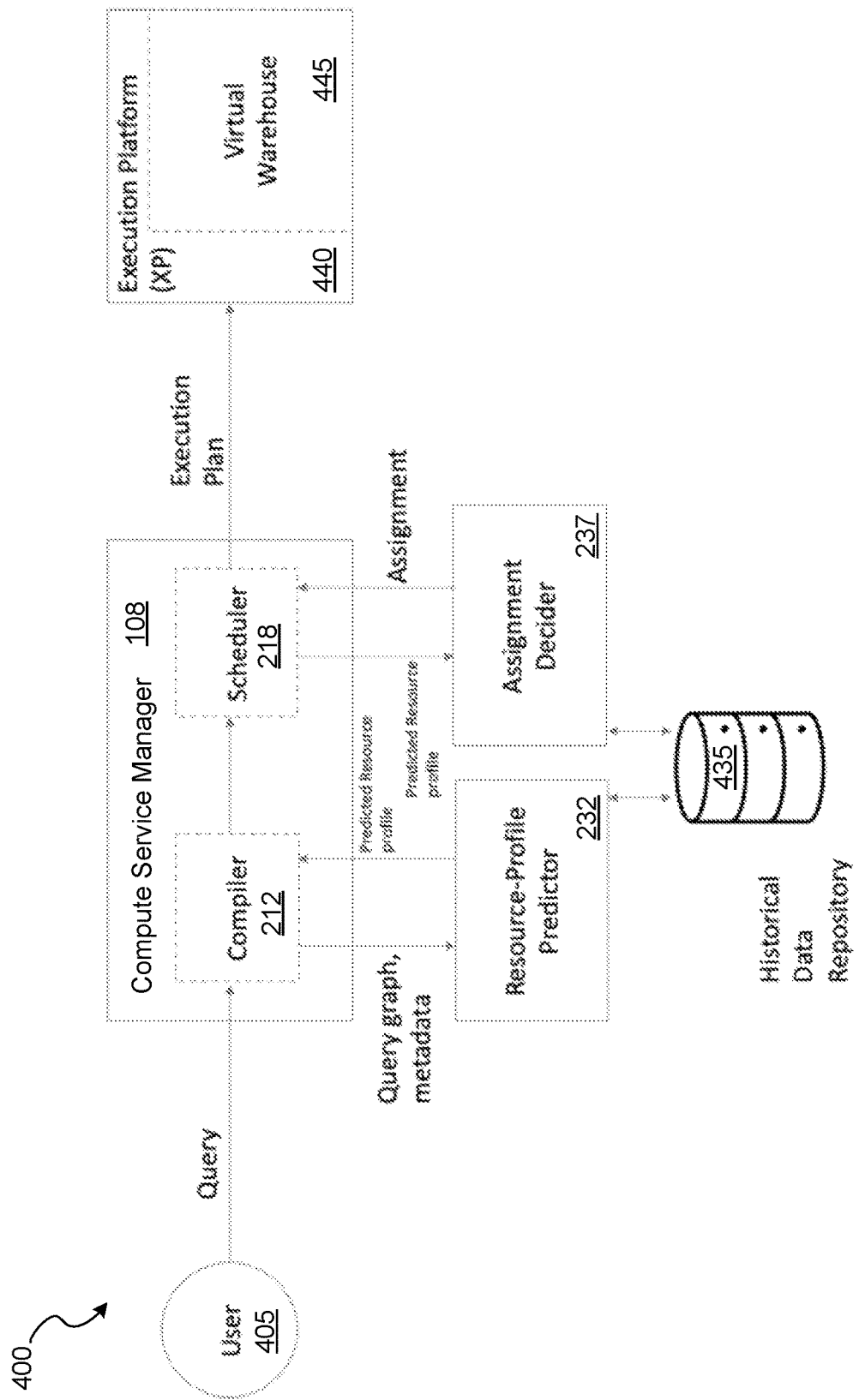
FIG. 4 shows an example computer architecture for implementing a query resource database system in a database network environment, according to some example embodiments.

FIG. 4 shows an example computer architecture 400 for implementing the query resource database system 230 in the computing environment 100, in accordance with some example embodiments. In the example illustrated, a user 405 submits a query (e.g., end-user that submits via client device 114) which is received by the compute service manager 108. The compiler 212 interfaces with the resource profile prediction engine 232 for metadata and query graph implementation. The resource profile prediction engine 232 interfaces with the historical data repository 435 to generate a predicted resource profile (e.g., resource data, a vector comprising one or more numbers for a level of resource usage per type: e.g., CPU usage amount, memory footprint amount, network usage amount, etc.) for the given query (or query pool) from the user 405. The predicted resource profile is then returned to the compiler 212, in accordance with some example embodiments. The predicted resource profile data, as well as the query graph, is then directed to the scheduler 218. The scheduler 218 interfaces with the assignment decider engine 237 to pass the predicted resource profile data. The assignment decider engine 237 accesses the historical data repository 435 to generate assignment data (e.g., key-values, keys that correspond to values per parameter). In some example embodiments, the assignment data comprises which machines or nodes the query should run (e.g., which are not under burden, or which machines have the relevant query data cached), and how much of each resource of each machine (e.g., CPU, memory) should be used upon a given machine being used to execute the query (e.g., query tasks), which is then returned to the scheduler 218, after which point the compute service manager 108 generates a query execution plan that is transmitted to one or more virtual warehouses, such as virtual warehouse 445 in the execution platform 440 for query execution and processing against database data (e.g., table data) in the storage platform 104.

Figure 5:
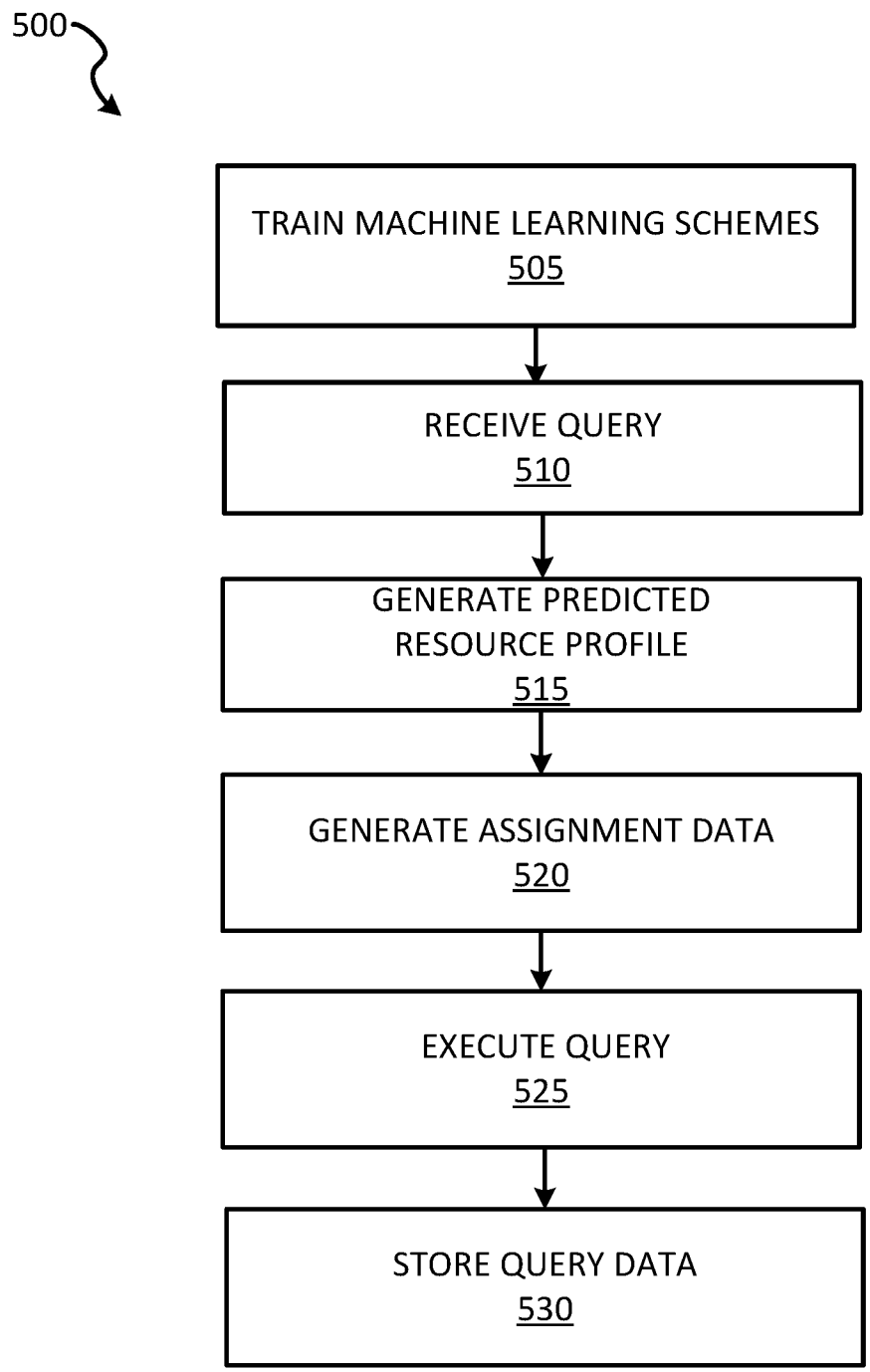
FIG. 5 shows a flow diagram of a method for implementing a query resource system, according to some example embodiments.

FIG. 5 shows a flow diagram of a method 500 for implementing a query resource system, in accordance with some example embodiments. At operation 505, the query resource database system 230 trains one or more machine learning schemes on training data. In some example embodiments, a first machine learning scheme (e.g., decision tree, fully connected neural network) is trained to generate predicted resource profiles based on historical data (e.g., historical database dataset, previous query plans of previous queries, previous predicted resource profiles implemented for the previous query plans). Further, a second machine learning scheme is trained to generate an assignment based on historical data. In some example embodiments, the second machine learning scheme generates resource profile data and node state data (e.g., previous predicted resource profiles and the corresponding previous state data sets of the plurality of nodes). In some example embodiments, the second machine learning scheme is further trained on user usage data of the end-user that generated the query and query pool data of a plurality of queries pooled for execution on the plurality of nodes.

At operation 510, the query resource database system 230 receives a query. For example, an end-user of a distributed database submits a query for execution on database data using a plurality of nodes (e.g., execution nodes). At operation 515, the query resource database system 230 generates a predicted resource profile for the query. For example, the first machine learning scheme receives a query plan (e.g., query graph, directed acyclic graph) and metadata values generated from a compiler of the database and generates the predicted resource profile.

At operation 520, the query resource database system 230 generates assignment data. For example, at operation 520, the second machine learning scheme receives compiler data from the database compiler 212 and the predicted resource profile to generate the assignment data.

At operation 525, the distributed database executes the query. For example, at operation 525, the scheduler 218 of the database generates an execution plan using the assignment data of operation 520 and generates an execution plan (based on the assignment data and data received from the compiler). The execution plan is then transmitted to the plurality of nodes and executed by the plurality of nodes according to the execution plan. At operation 530, the distributed database stores query results data (e.g., in storage platform 104).

Described implementations of the subject matter can include one or more features, alone or in combination as illustrated below by way of example.

Example 1. A method comprising: receiving a query for execution on a dataset of a distributed database using a plurality of nodes; generating, by a database compiler of the distributed database, a query graph for execution of the query and database metadata of the dataset; generating a predicted computational resource profile by applying a first machine learning scheme on the query graph and database metadata, the predicted computational resource profile comprising predicted computational usage values for execution of the query using the plurality of nodes, the first machine learning scheme trained on a historical database dataset comprising previous query plans of previous queries and previous predicted resource profiles implemented for the previous query plans; generating assignment data to execute processes of the query on the plurality of nodes, the assignment data generated by applying a second machine learning scheme to current state data of the current computational state (e.g., CPU levels, available memory, network usage) of the plurality of nodes and the predicted computational resource profile generated by the first machine learning scheme, the assignment data assigning nodes and corresponding computational node usage values to the plurality of nodes for execution the query; executing the query on the plurality of nodes according to the assignment data; and storing query results.

Example 2. The method of example 1, wherein the predicted resource profile comprises a vector of computational resource values for use in query execution on the plurality of nodes.

Example 3. The method of any one of examples 1 or 2, wherein the computational resource values comprise computer processor usage values, memory values, network activity values of the plurality of nodes.

Example 4. The method of any one of examples 1-3, further comprising: requesting, over a network, current state data from the plurality of nodes; and receiving, other the network, the current state data from the plurality of nodes.

Example 5. The method of any one of examples 1-4, wherein the current state data comprises computational resource values of each node in the plurality of nodes.

Example 6. The method of any one of examples 1-5, wherein the historical database dataset further comprises previous state data sets of the plurality of nodes and corresponding previous assignment data sets implemented for corresponding previous state data items.

Example 7. The method of any one of examples 1-6, wherein each previous assignment data set is assignment data that was implemented for a particular previous state data set of the previous state data sets.

Example 8. The method of any one of examples 1-7, wherein the second machine learning scheme is trained on the previous predicted resource profiles and the corresponding previous state data sets of the plurality of nodes.

Example 9. The method of any one of examples 1-8, wherein the query is received from an end-user of a client device.

Example 10. The method of any one of examples 1-9, wherein the historical database dataset further comprises user usage data describing previous query workloads received from the end-user for execution on the distributed database.

Example 11. The method of any one of examples 1-10, wherein the second machine learning scheme is trained to generate the assignment data based on the user usage data, the previous predicted resource profiles and a previous state data sets of the plurality of nodes that correspond to the previous predicted resource profiles.

Example 12. The method of any one of examples 1-11, wherein a plurality of additional queries are queued for execution with the query in a query pool.

Example 13. The method of any one of examples 1-12, wherein the second machine learning scheme is trained to generate the assignment data based on a quantity of queries in the query pool.

Example 14. The method of any one of examples 1-13, wherein the second machine learning scheme is trained to generate the assignment data based on a query type for each of the plurality of additional queries in the query pool.

Example 15. The method of any one of examples 1-14, wherein the query type comprises one or more of: a database select operation, a database delete operation, and a database insert operation.

Example 16. The method of any one of examples 1-15, wherein the first machine learning scheme is a first decision tree, and wherein the second machine learning scheme is a second decision tree.

Example 17. The method of any one of examples 1-16, wherein the first machine learning scheme is a first neural network, and wherein the second machine learning scheme is a second neural network.

Example 18. The method of any one of examples 1-17, wherein the query plan is a directed acyclic graph of tasks to execute the query on the distributed database.

Example 19. A system comprising: one or more processors of a machine; and at least one memory storing instructions that, when executed by the one or more processors, cause the machine to perform any one of the methods of examples 1-18.

Example 20. A machine-storage media embodying instructions that, when executed by a machine, cause the machine to perform any one of the methods of examples 1-18.

Figure 6:
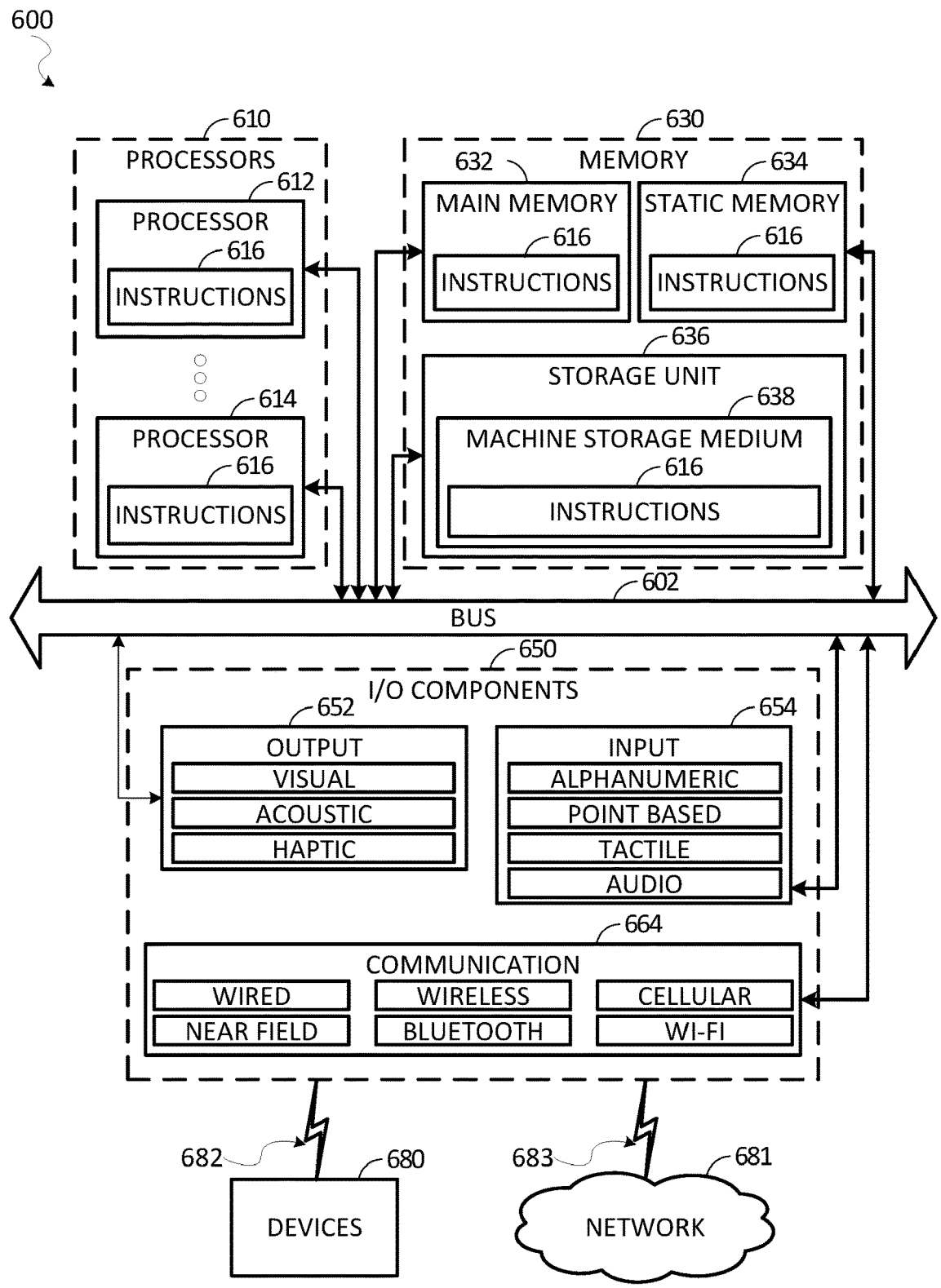
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code), for causing the machine 600 to perform any one or more of the methodologies discussed herein, may be executed. For example, the instructions 616 may cause the machine 600 to execute any one or more operations of any one or more of the methods of FIG. 5 or components in FIG. 1-4, by one or more processors. described herein. As another example, the instructions 616 may cause the machine 600 to implement portions of the data flows described herein. In this way, the instructions 616 transform a general, non-programmed machine into a particular machine 600 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 comprising a machine storage medium 638 may store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines, such as mobile phones, will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 681 via a coupler 683 or to devices 680 via a coupling 682. For example, the communication components 664 may include a network interface component or another suitable device to interface with the network 681. In further examples, the communication components 664 may include wired communication components, wireless communication components, cellular communication components, and other communication components to provide communication via other modalities. The devices 680 may be another machine or any of a wide variety of peripheral devices (e.g., a peripheral device coupled via a universal serial bus (USB)). For example, as noted above, the machine 600 may correspond to any one of the client device 114, the compute service manager 108, the execution platform 110, and may include any other of these systems and devices.

The various memories (e.g., 630, 632, 634, and/or memory of the processor(s) 610 and/or the storage unit 636) may store one or more sets of instructions 616 and data structures (e.g., software), embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 681 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 681 or a portion of the network 681 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 681 using a transmission medium via a network interface device (e.g., a network interface component included in the communication components 664), and utilizing any one of a number of well-known transfer protocols (e.g., hypertext transfer protocol (HTTP)). Similarly, the instructions 616 may be transmitted or received using a transmission medium via the coupling 682 (e.g., a peer-to-peer coupling) to the devices 680. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    receiving a query for execution on a dataset of a distributed database using a plurality of nodes;
    generating, by a database compiler of the distributed database, a query graph for execution of the query and database metadata of the dataset;
    generating a predicted computational resource profile by applying a first machine learning scheme on the query graph and the database metadata, the predicted computational resource profile comprising predicted computational usage values for execution of the query using the plurality of nodes, the first machine learning scheme trained on a historical database dataset comprising previous query plans of previous queries and previous predicted resource profiles implemented for the previous query plans;
    generating assignment data to execute processes of the query on the plurality of nodes, the assignment data generated by applying a second machine learning scheme to current state data of a current computational state of the plurality of nodes and the predicted computational resource profile generated by the first machine learning scheme, the assignment data assigning nodes and corresponding computational node usage values to the plurality of nodes for execution the query;
    executing the query on the plurality of nodes according to the assignment data; and
    storing query results.

2. The method of claim 1, wherein the predicted computational resource profile comprises a vector of computational resource values for use in query execution on the plurality of nodes.

3. The method of claim 2, wherein the computational resource values comprise computer processor usage values, memory values, network activity values of the plurality of nodes.

4. The method of claim 1, further comprising:
requesting, over a network, current state data from the plurality of nodes; and
receiving, other the network, the current state data from the plurality of nodes.

5. The method of claim 4, wherein the current state data comprises computational resource values of each node in the plurality of nodes.

6. The method of claim 1, wherein the historical database dataset further comprises previous state data sets of the plurality of nodes and corresponding previous assignment data sets implemented for corresponding previous state data items.

7. The method of claim 6, wherein each previous assignment data set is assignment data that was implemented for a particular previous state data set of the previous state data sets.

8. The method of claim 6, wherein the second machine learning scheme is trained on the previous predicted computational resource profiles and the corresponding previous state data sets of the plurality of nodes.

9. The method of claim 1, wherein the query is received from an end-user of a client device.

10. The method of claim 9, wherein the historical database dataset further comprises user usage data describing previous query workloads received from the end-user for execution on the distributed database.

11. The method of claim 10, wherein the second machine learning scheme is trained to generate the assignment data based on the user usage data, the previous predicted computational resource profiles and previous state data sets of the plurality of nodes that correspond to the previous predicted computational resource profiles.

12. The method of claim 1, wherein a plurality of additional queries are queued for execution with the query in a query pool.

13. The method of claim 12, wherein the second machine learning scheme is trained to generate the assignment data based on a quantity of queries in the query pool.

14. The method of claim 13, wherein the second machine learning scheme is trained to generate the assignment data based on a query type for each of the plurality of additional queries in the query pool.

15. The method of claim 14, wherein the query type comprises one or more of: a database select operation, a database delete operation, and a database insert operation.

16. The method of claim 1, wherein the first machine learning scheme is a first decision tree, and wherein the second machine learning scheme is a second decision tree.

17. The method of claim 1, wherein the first machine learning scheme is a first neural network, and wherein the second machine learning scheme is a second neural network.

18. The method of claim 1, wherein the query plan is a directed acyclic graph of tasks to execute the query on the distributed database.

19. A system comprising:
one or more processors of a machine; and
at least one memory storing instructions that, when executed by the one or more processors, cause the machine to perform operations comprising:
receiving a query for execution on a dataset of a distributed database using a plurality of nodes;
generating, by a database compiler of the distributed database, a query graph for execution of the query and database metadata of the dataset;
generating a predicted computational resource profile by applying a first machine learning scheme on the query graph and database metadata, the predicted computational resource profile comprising predicted computational usage values for execution of the query using the plurality of nodes, the first machine learning scheme trained on a historical database dataset comprising previous query plans of previous queries and previous predicted computational resource profiles implemented for the previous query plans;
generating assignment data to execute processes of the query on the plurality of nodes, the assignment data generated by applying a second machine learning scheme to current state data of a current computational state of the plurality of nodes and the predicted computational resource profile generated by the first machine learning scheme, the assignment data assigning nodes and corresponding computational node usage values to the plurality of nodes for execution the query;
executing the query on the plurality of nodes according to the assignment data; and
storing query results.

20. The system of claim 19, wherein the predicted computational resource profile comprises a vector of computational resource values for use in query execution on the plurality of nodes.

21. The system of claim 20, wherein the computational resource values comprise computer processor usage values, memory values, network activity values of the plurality of nodes.

22. The system of claim 19, the operations further comprising:
requesting, over a network, current state data from the plurality of nodes; and receiving, other the network, the current state data from the plurality of nodes.

23. The system of claim 22, wherein the current state data comprises computational resource values of each node in the plurality of nodes.

24. A machine-storage media embodying instructions that, when executed by a machine, cause the machine to perform operations comprising:
receiving a query for execution on a dataset of a distributed database using a plurality of nodes;
generating, by a database compiler of the distributed database, a query graph for execution of the query and database metadata of the dataset;
generating a predicted computational resource profile by applying a first machine learning scheme on the query graph and database metadata, the predicted computational resource profile comprising predicted computational usage values for execution of the query using the plurality of nodes, the first machine learning scheme trained on a historical database dataset comprising previous query plans of previous queries and previous predicted computational resource profiles implemented for the previous query plans;

generating assignment data to execute processes of the query on the plurality of nodes, the assignment data generated by applying a second machine learning scheme to current state data of a current computational state of the plurality of nodes and the predicted computational resource profile generated by the first machine learning scheme, the assignment data assigning nodes and corresponding computational node usage values to the plurality of nodes for execution the query;

executing the query on the plurality of nodes according to the assignment data; and storing query results.

25. The machine-storage media of claim 24, wherein the predicted computational resource profile comprises a vector of computational resource values for use in query execution on the plurality of nodes.

\* \* \* \* \*

UNITED STATES PATENT AND TRADEMARK OFFICE
CERTIFICATE OF CORRECTION

PATENT NO. : 11,620,289 B1
APPLICATION NO. : 17/930277
DATED : April 4, 2023
INVENTOR(S) : Jiang et al.

It is certified that error appears in the above-identified patent and that said Letters Patent is hereby corrected as shown below:

In the Claims

In Column 22, Line 45, in Claim 22, after "and", insert a linebreak

Signed and Sealed this
Thirtieth Day of July, 2024

Katherine Kelly Vidal
*Director of the United States Patent and Trademark Office*